Oct. 19, 1965

J. C. KYLE 3,212,321

ENCAPSULATED EXTENSOMETER

Filed March 7, 1962

INVENTOR:
James C. Kyle

By Smyth, Roston & Pavitt
Attorneys

Oct. 19, 1965    J. C. KYLE    3,212,321
ENCAPSULATED EXTENSOMETER
Filed March 7, 1962    7 Sheets-Sheet 2

INVENTOR:
James C. Kyle
By Smyth, Roston & Pavitt
Attorneys

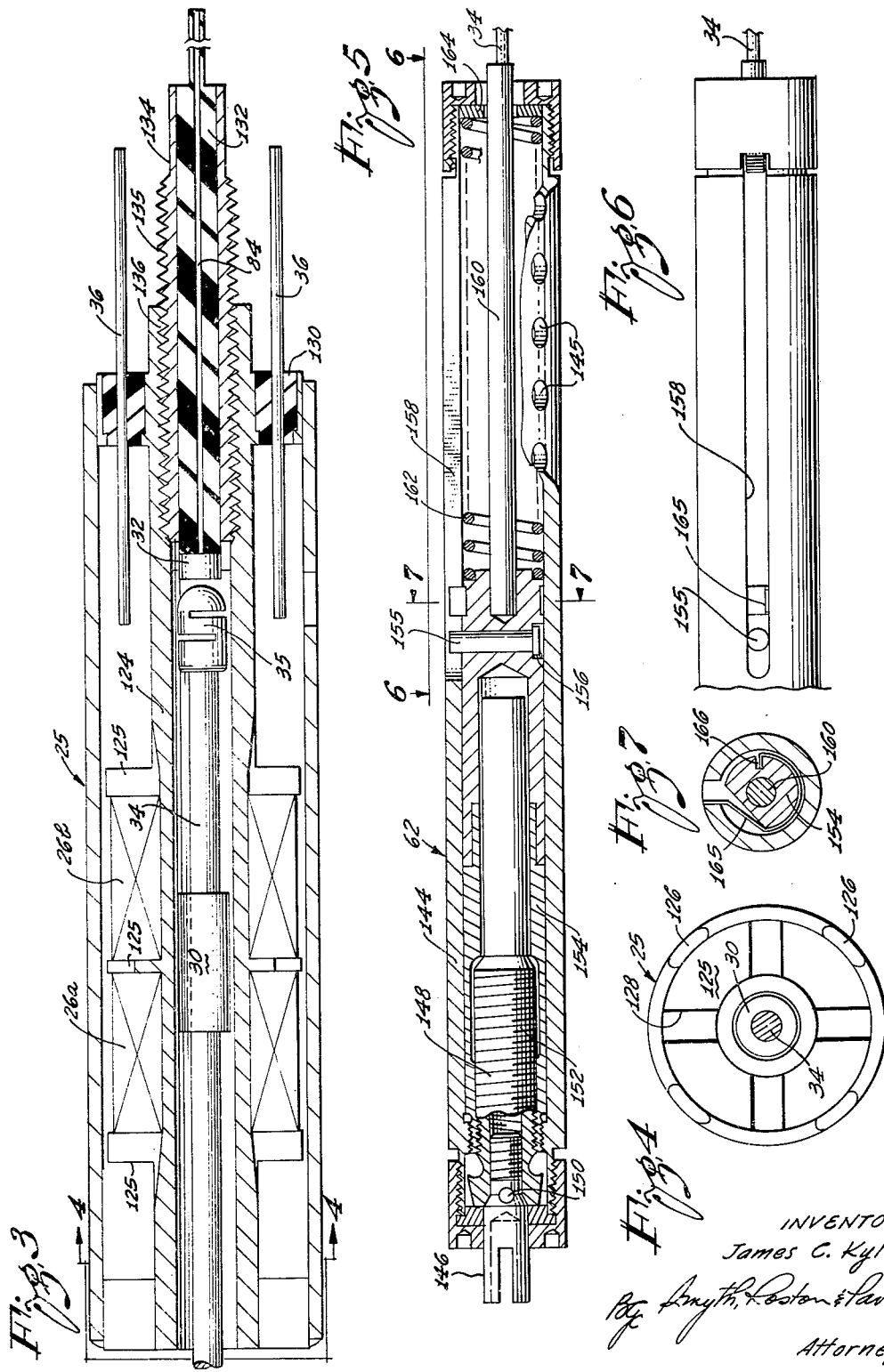

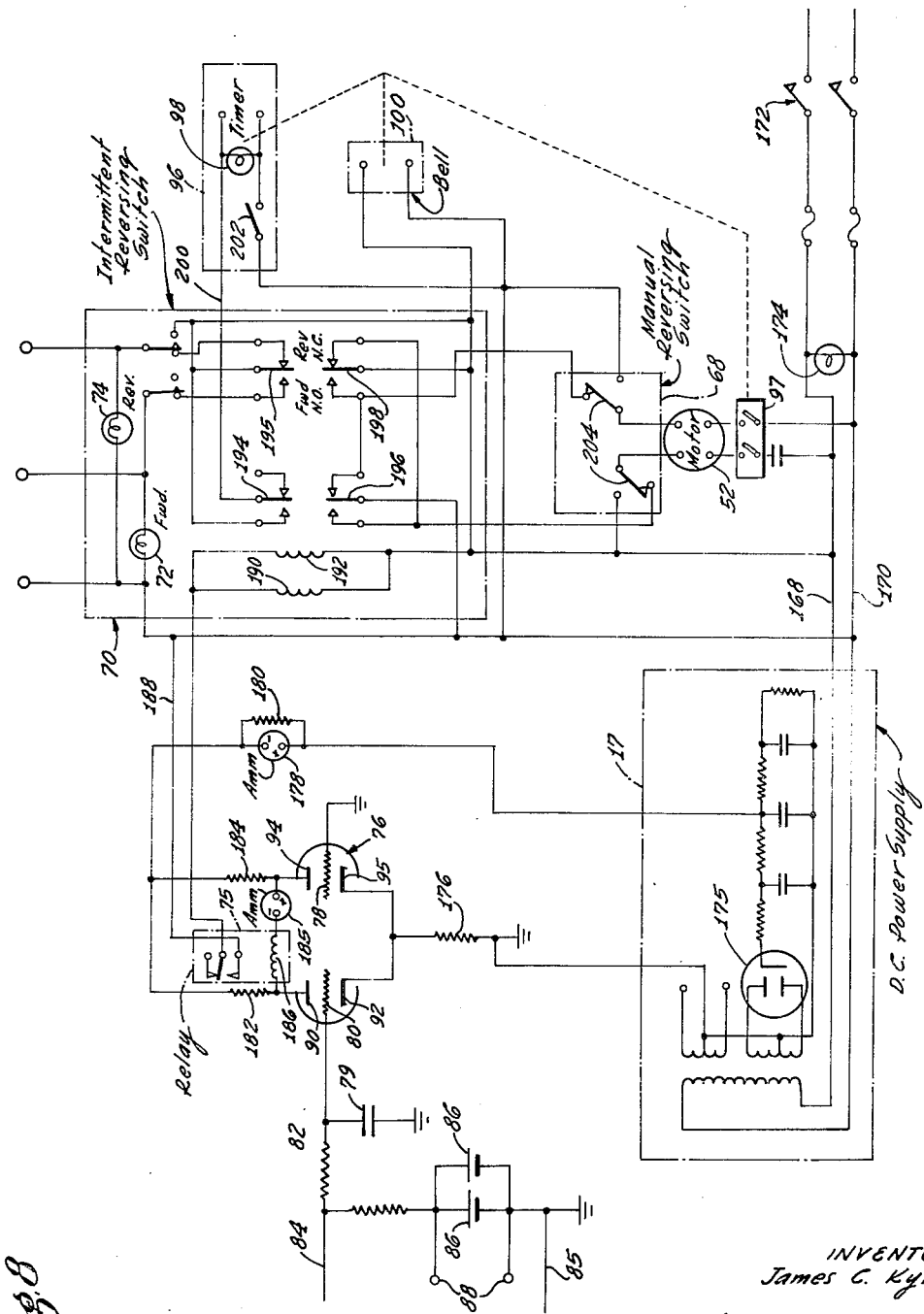

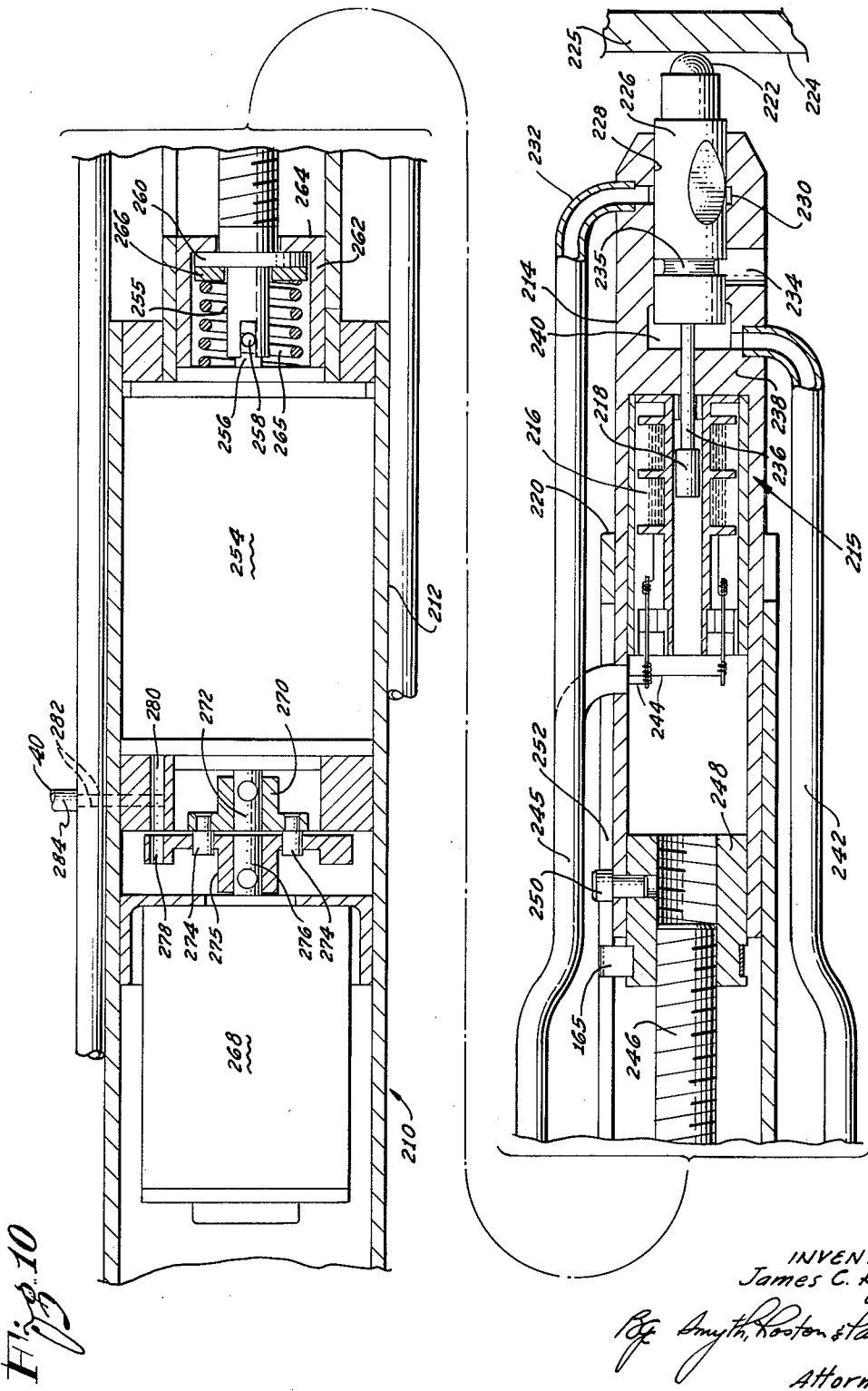

Oct. 19, 1965 J. C. KYLE 3,212,321
ENCAPSULATED EXTENSOMETER
Filed March 7, 1962 7 Sheets-Sheet 6
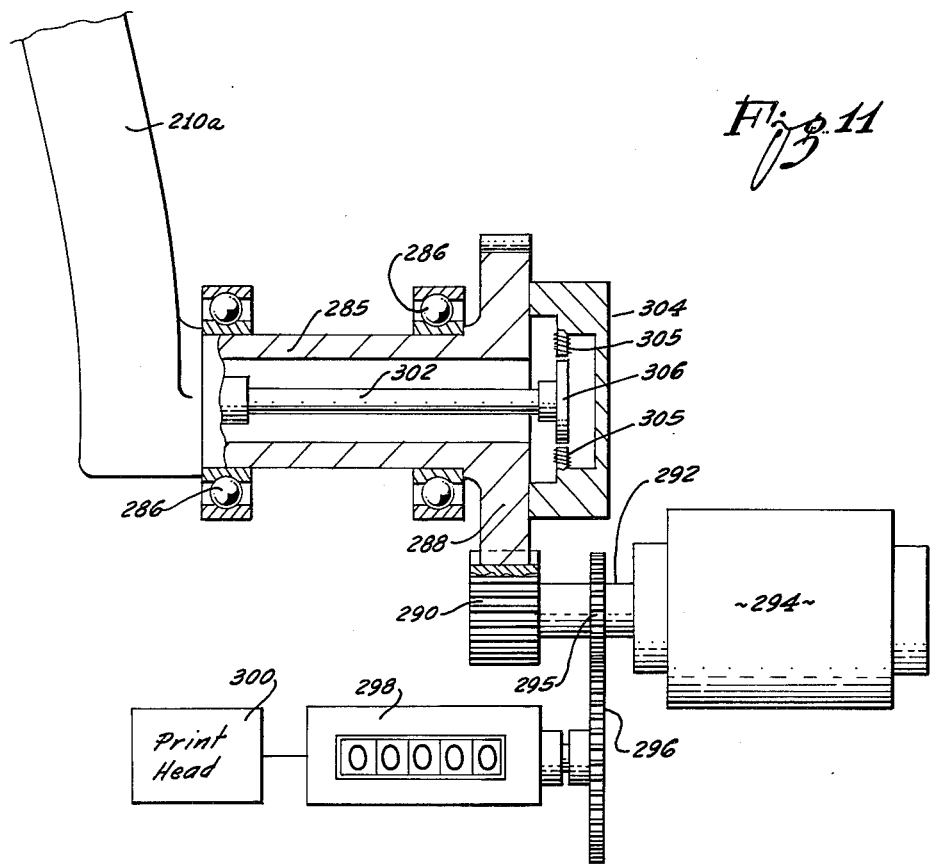
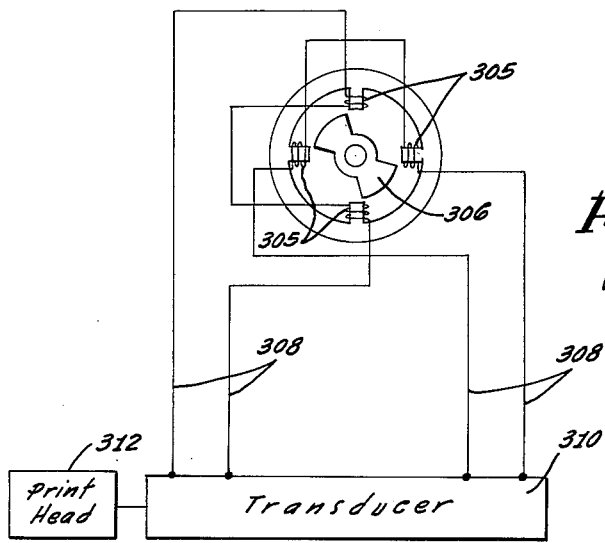
INVENTOR:
James C. Kyle
Attorneys

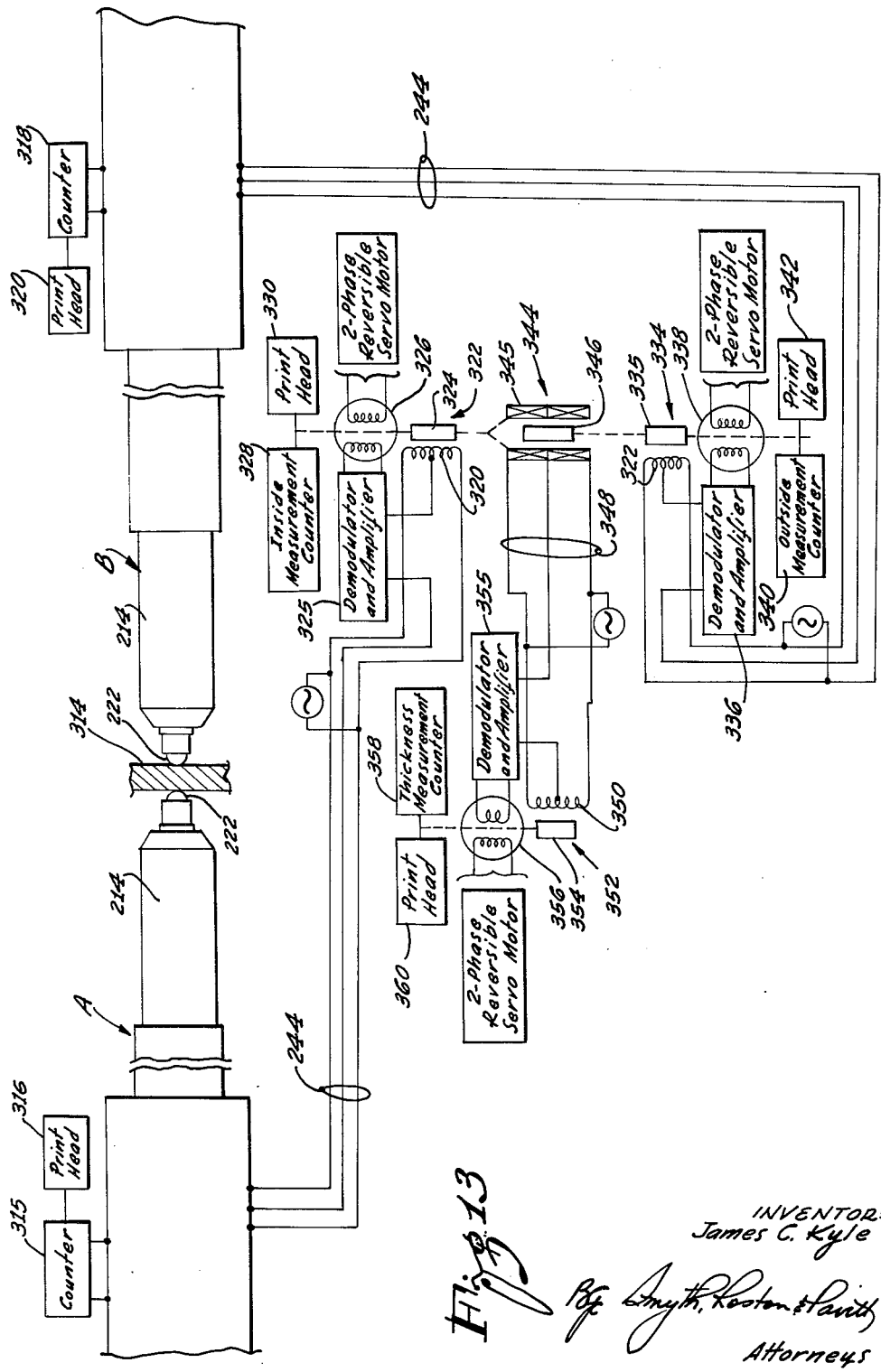

United States Patent Office 3,212,321
Patented Oct. 19, 1965

3,212,321
ENCAPSULATED EXTENSOMETER
James C. Kyle, Glendora, Calif., assignor, by mesne assignments, to Physical Sciences Corporation, a corporation of California
Filed Mar. 7, 1962, Ser. No. 178,081
25 Claims. (Cl. 73—15.6)

This invention relates to an extensometer and in one embodiment, is directed to the task of measuring changes in dimensions of specimens in a detrimental environment. Such an embodiment of the invention is widely applicable for its purpose, for example for testing specimens in a high ambient temperature. The embodiment has special utility, however, for measuring the creep of specimens in an environment of high nuclear radiation such as the interior of a nuclear reactor.

A number of difficulties arise in the measurement of creep in the interior of a nuclear reactor. One problem is that the measurements must be carried out by remote control. Another problem is to achieve a high degree of accuracy under the handicaps imposed by the necessity of remote control and the necessity of resorting to telemetering. Still another problem is to maintain the specimen under a constant predetermined stress with the magnitude of the stress unaffected by changes in the temperature of the environment and unaffected by changes in dimension of the specimen. A further problem is to maintain the temperature of the specimen at a high temperature even though the high temperature of the environment may be interrupted. A still further problem is to achieve reliability.

A high degree of accuracy is achieved by means of a highly sensitive transducer arrangement for remote measurement of the creep of the specimen. Since such a highly accurate transducer has a limited measuring range for following creep changes, the invention further provides a mechanical index means to shift a component of the transducer by measured amounts and thus shift the range of measurement as many times as required for covering the full range of the creep of the specimen. In this regard an important feature of the invention is that the indexing means is capable of measuring the creep of the specimen independently of the transducer system. The mechanical indexing system may be used as check on the measurements obtained by the transducer system; the transducer system may be used to check on the indexing system; and either system may be relied upon solely for the required creep data in the event that the other system fails.

The problem of keeping the stress of the specimen constant is achieved by employing fluid pressure of constant magnitude against a constant area. For this purpose the specimen together with components of the transducer system and components of the indexing system is placed in a sealed capsule and the interior of the capsule is divided into two compartments by a bellows structure, one of the compartments being the interior of the bellows structure. One of these compartments is vented to the atmosphere and the other is placed in communication with a remote source of gaseous fluid under constant pressure to apply a predetermined differential force against the bellows structure. One end of the specimen is anchored to the capsule and the other end is attached to the bellows structure. In such an arrangement the stress that is applied to the specimen is not affected by expansion or contraction of the gaseous fluid and is not influenced by dimensional changes in the material of the capsule and of the bellows structure.

The problem of maintaining a continuous temperature history for the specimen as required for accurate creep data arises from the fact that the temperature in a reactor varies and especially so because a reactor may be closed down during a portion of the creep test. This problem is solved by providing the capsule with heating means in the form of electrical heating elements under thermostatic control. In the preferred practice of the invention, cooling means is also provided under thermostatic control to avoid excessive rises in temperature of the specimen.

A second embodiment of the invention has the function of exploring a surface of an object to determine variations in the surface as measured from a suitable reference. The reference may be a point, or an axis or a predetermined reference path close to the surface, the reference path being a straight line for exploring a planar surface or an arcuate line for exploring a curved surface. This practice of the invention may be used, for example, to ascertain the precise configuration and variations in thickness of a flat plate or of a cylindrical plate, or of a spherically curved wall such as the wall of a dome-shaped object.

The features and advantages of the invention may be understood from the following description, together with the accompanying drawings.

In the drawings, which are to be regarded as merely illustrative:

FIG. 1 is a diagram of the first embodiment of the invention;

FIG. 2 which is broken into three sections is a view partly inside elevation and partly in section of the capsule of the first embodiment and the passage structure that connects the capsule with remote stations;

FIG. 3 is a longitudinal sectional view showing the construction of the transducer in the capsule and the associated indexing means;

FIG. 4 is a transverse section taken on the line 4—4 of FIG. 3;

FIG. 5 is a view largely in cross-section and partly in side elevation showing a portion of the mechanism of the indexing means;

FIG. 6 is a fragmentary plan view of the mechanism as seen along the line 6—6 of FIG. 5;

FIG. 7 is a transverse section along the line 7—7 of FIG. 5 showing a torque spring for elimination of backlash;

FIG. 8 is a wiring diagram of the electrical components of the selected embodiment of the invention;

FIG. 9 is a fragmentary sectional view showing a modification in which a tubular heating element may be used as a cooling coil;

FIG. 10 is a longitudinal sectional view of the mechanism of a second embodiment of the invention which is a unit having the function of exploring the surface of an object;

FIG. 11 is a fragmentary view partly in section and partly diagrammatic showing how an arm incorporating the exploratory unit of FIG. 10 may be mounted for rotation about an axis with provision for detecting changes in the torque load on the arm;

FIG. 12 is a diagram of the torque meter incorporated in the structure shown in FIG. 11; and FIG. 13 is a view that is partly elevational and partly schematic showing how two exploratory units may be used to determine the precise configuration and variations in thickness of a curved wall member.

GENERAL ARRANGEMENT OF THE FIRST EMBODIMENT

Figure 1:
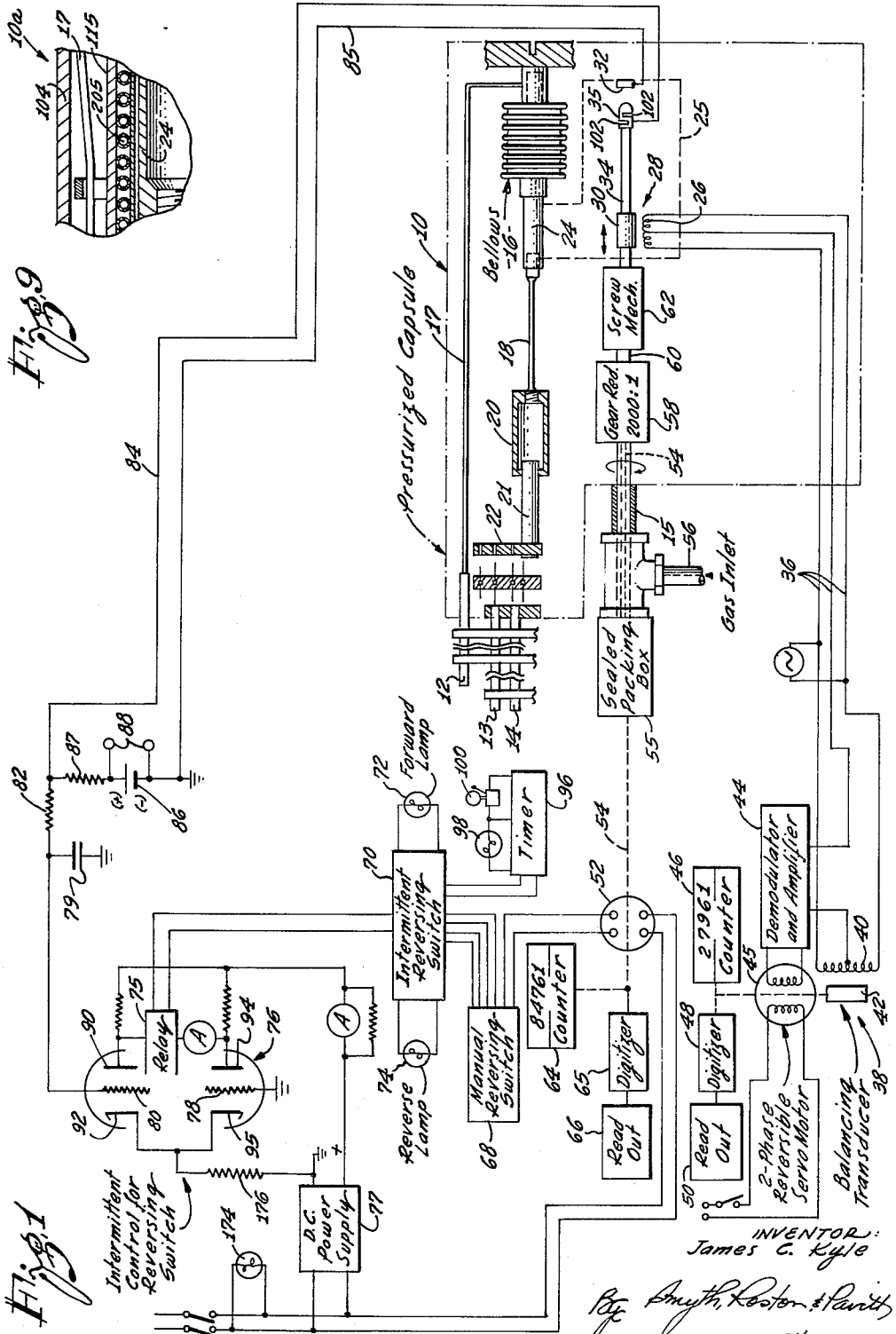

The general arrangement of the device may be understood by referring to the diagram in FIG. 1. A fluid-tight capsule for positioning in a reactor is indicated by the block 10 shown in broken lines and may be made of suitable metal, for example, steel. The capsule 10 is carried by a multiple-conduit passage means which, in FIG. 1, includes conduits 12–15. The passage means is relatively long to permit the conduits 12–15 to extend to remote stations that are safely shielded from the detrimental environment inside the reactor.

Mounted inside the capsule 10 is a metal bellows structure 16 that divides the interior of the capsule into two separate compartments, one of the compartments being the interior of the bellows structure and the other compartment being the remaining space inside the capsule. In the construction shown, the interior of the compartment formed by the bellows structure is vented to the atmosphere through tube 17 that extends through the conduit 12. The second compartment is maintained under fluid pressure by a gaseous fluid which is supplied from a regulated constant pressure source through the conduit 15. The gaseous fluid may be a suitable inert gas such as helium and may be maintained automatically at a pressure on the order of 500 p.s.i.g.

One end of a specimen 18 that is to be tested is fixedly connected to the structure of the capsule 10 by means of members 20–22 and the other end of the specimen is connected to an end wall of the bellows structure 16 by means of a fitting 24. It is apparent that with relatively high pressure outside the bellows structure and atmospheric pressure inside the bellows structure, the bellows structure is subjected to a high magnitude differential fluid pressure that places the specimen 18 under tension. Obviously, a similar arrangement could be used to place the specimen under compression and, if desired, the arrangement could be reversed with high pressure fluid supplied to the interior of the bellows structure and the remainder of the capsule vented to the atmosphere.

Attached to the fitting 24 to move therewith as the specimen 18 elongates is a carriage inside the capsule 10, the carriage being indicated by a block 25 shown in broken lines. Mounted on the carriage 25 to move therewith is the coil component 26 of a displacement transducer that is generally designated 28, the transducer having a core component 30. The displacement transducer 28 is of a variable permeance type of a well known construction in which the position of the core is sensed by the pair of coils of the coil component. Also fixedly mounted on the carriage 25 to move in response to extension of the specimen 18 is what may be termed the stop member 32.

The transducer core 30 is mounted on what may be termed a sensing rod 34 which is normally stationary but which may be advanced when desired in the direction of elongation of the specimen 18. Mounted on the leading end of the sensing rod 34 is a body 35 which may be termed a probe since it is used in the manner of a probe to ascertain the position of the stop member 32.

In a well known manner, the coil component 26 of the displacement transducer 28 is connected by three wires 36 with a balancing transducer, generally designated 38, at a remote station that is shielded from radiation, the balancing transducer having a coil component 40 and a core component 42. The three wires 36 which extend through one of the conduits 12–15 are connected both to the coil component 40 of the balancing transducer and to a demodulator and amplifier unit 44 which controls a two phase reversible servo motor 45. The motor 45 controls the position of the balancing core 42 and is operatively connected to a counter 46 and to a digitizer 48 that is provided with a readout 50.

Since the servo motor 45 is automatically controlled by the demodulator and amplifier to maintain the balancing core 42 at the same position relative to the coil component 40 as the position of the displacement core 30 relative to the coil component 26, the servo motor measures the relative movement between the displacement core 30 and the coil component 26. Each count that is fed to the counter 46 and the digitizer 48 represents 30 microinches of relative displacement between the core 30 and the coil component 26 and therefore represents corresponding elongation of the specimen 18. The two transducers 28 and 38 as well as the associated circuitry and servo motor are supplied to industry by Physical Sciences Corporation in Pasadena, California, and therefore need not be described in further detail.

The sensing rod 34 that carries both the core 30 and the probe 35 is controlled by a reversible motor 52 at a remote station. The shaft 54 of the motor 52 extends through a sealed packing box 55 into the conduit 15 that supplies the high pressure fluid to the capsule. The conduit 15 has a branch 56 which is connected to a suitable regulated source which supplies the gaseous fluid and maintains the gaseous fluid at constant pressure. Inside the capsule 10 the motor shaft 54 is connected to reduction gearing in a gear box 58. The output shaft 60 of the gear box is connected to a screw mechanism 62 that converts rotary motion into linear longitudinal motion of the sensing rod 34 that carries the core 30 and the probe 35. The motor 52 is operatively connected to a counter 64 and to a digitizer 65 having a readout 66. Rotation of the shaft 54 by the motor 52 produces one count for each 10 microinch of elongation of the specimen 18.

The motor 52 which is normally deenergized may be operated by a manual reversing switch 68 or may be operated automatically by an intermittent reversing switch 70 which is provided with a lamp 72 to indicate forward rotation of the motor and is provided with a lamp 74 to indicate rearward rotation. The automatic intermittent reversing switch 70 is controlled by a sensitive relay 75 which, in turn, is controlled by the two plate circuits of a dual amplifier 76. The dual amplifier 76 is energized by a D.C. power supply 77. One grid 78 of the dual amplifier 76 is grounded and therefore is always negative since the negative side of the D.C. power supply 77 is grounded. The other grid 80 is connected to a grounded capacitor 79 and is connected through a resistor 82 to a wire 84 that is connected to the probe 35. The stop member 32 is connected by a wire 85 to ground. A suitable biasing battery means 86 is connected on its positive side by a resistor 87 to the wire 84 and is grounded on its negative side. The battery means 86 has a pair of terminals 88 for testing purposes.

With the probe 35 spaced away from the stop member 32, the battery-shunting circuit formed by the wires 84 and 85 together with the resistor 87 is open so that the battery 86 gives the grid 80 a positive bias to cause current to flow between the anode 90 and the cathode 92 of the dual amplifier. Since the grid 78 is grounded, however, no current flows from the second anode 94 to the second cathode 95. Consequently a voltage exists across the sensitive relay 75 to cause the relay to operate the intermittent reversing switch 70 for moving the sensing rod 34 forward to carry the probe 35 towards the stop member 32.

When the probe 35 closely approaches contact with the stop member 32 it reduces the resistance across the gap in the circuit that shunts the battery 86 and thereby causes the grid 80 to go negative and thus cut off flow of current from the anode 90 to the cathode 92. In other words, when the probe 35 approaches the contact 32 the resistance between these two drops low enough to allow the negative voltage or current of the D.C. power supply 77 to override the positive side of battery 86 and thus cause grid 80 to go negative, thereby cutting off the current to relay 75. With both grids 78 and 80 negative no voltage exists across the sensitive relay 75 and the relay operates the intermittent reversing switch 70 to reverse the motor for retraction of the probe 35. Retraction of the probe 35 again opens the battery-shunting circuit to cause the grid 80 to go positive, whereupon the sensitive relay 75 again operates the intermittent reversing switch 70 to reverse the motor 52. In this manner the probe 35 is caused automatically to reciprocate over a short distance by repeatedly approaching the stop member 32 and then retracting from the stop member.

When the intermittent reversing switch is operating normally the probe 35 travels forward to the stop member 32 in a normal time interval. A timer 96 operated by the intermittent reversing switch 70 is energized each time the reversing switch operates to return the probe 35 to the stop member 32. The timer is set for a slightly longer time interval than the normal time interval for the probe 35 to reach the critical close proximity to the stop member 32. If the intermittent reversing switch 70 does not reverse the motor 52 within the time interval for which the timer 96 is set, the timer de-energizes the motor by opening a double pole switch 97 to stop the forward progress of the probe 35. At the same time the timer energizes a signal lamp 98 and an alarm bell 100 to call attention to the malfunctioning of the control system. Preferably the probe 35 is made slightly resilient by a pair of staggered slots 102 so that the probe yields by slight resilient deformation in the event the motor pushes the probe against the stop member. Since the probe moves exceedingly slowly, the timer 96 is effective to keep the probe from being stressed beyond its elastic limits.

Operation

In a typical application of the invention a Zircaloy-2 specimen is stressed in tension to a maximum of 40,000 p.s.i. The stress is initiated after a reactor exposure to $1 \times 10^{18}$ nvt to a resolution of 0.1% (plus or minus) and the stress is maintained for a period of time of at least 1000 hours (neutron exposure to an accumulated maximum of $1 \times 10^{20}$ nvt). "nvt" is a unit of nuclear radiation denoting a total integrated flux of neutrons over a given time. Its units are neutrons per square centimeter. Nuclear radiation of neutron dose rate is usually expressed in terms of "nv" or neutrons per square centimeter per second. The change from $1 \times 10^{18}$ "nvt" to $1 \times 10^{20}$ "nvt" during a period of 1,000 hours means that during 3,600,000 seconds, or $3.6 \times 10^6$ sec., that approximately $200 \times 10^{18}$ "nvt" or neutrons per square centimeter flowed. In other words, the neutron flux density was $5.5 \times 10^{13}$ "nv" or neutrons per square centimeter per second. The temperature that is to be maintained on the specimen throughout the test, including the periods in which the reactor is turned off, is within the range of 250 to 400° C. The specimen to be tested may be 2 inches long and the range of creep measurement may be on the order of 0.4 inch.

At the start of a test, a reference point is ascertained for creep measurement by turning control of the sensing rod 34 over to the automatic intermittent reversing switch 70 to cause the probe 35 to be advanced against the stop member 32 and to continually reciprocate relative to the stop member. The reference point may then be established by referring to the counter 64 and the read-out 66 of the digitizer may record the reference point on tape. The sensing rod 34 is then retracted by means of the manual reversing switch to place the displacement core 30 of the displacement transducer 28 at a rightward position relative to the associated coil component 26 to make available the full range of measurement of .030 inch of the displacement transducer. The reference point for the transducer system for starting the test is then noted on the counter 46 and may be placed on tape by the read-out 50 of the digitizer 48.

With the motor 52 deenergized, the transducer system operates automatically to follow the progressive elongation of the specimen. As the carriage 25 shifts the coil component 26 rightward in FIG. 1 relative to the associated displacement core 30 to follow the elongation of the specimen, the balancing core 42 of the balancing transducer accurately follows the position of the displacement core 30 relative to the coil component 26. Consequently the movement of the coil component 26 is measured and is registered by the counter 46 and the digitizer 48. As the limit of the measuring range of .030 inch of the displacement transducer 28 is approached, the motor 52 is again energized by the manual switch 68 to advance the displacement core 30, the displacement core being advanced approximately .030 inch under the guidance of the counter 64. In this manner the displacement transducer core 30 may be advanced, for example, ten times in the course of the test for a total creep measurement on the order of 0.30 inch. The transducer is accurate to 0.000030 inch which is 1/10 of 1% in the range of 0.030 inch. Since this range of 0.030 inch is repeated ten times with the same accuracy of 0.000030 inch, the accuracy achieved over the whole range of 0.30 is 1/100 of 1%.

At the start of a measuring operation by the displacement transducer 28 when the coil component 26 is at a leftward limit position relative to the core 30, the probe 35 is retracted relative to the stop member 32. As the measuring operation of the transducer system proceeds with the coil component 26 shifting rightward relative to the core 30, the stop member 32 correspondingly retreats from the probe 35. Thus when the coil component 26 reaches its rightward limit measuring position relative to the stationary core 30, the probe 35 is spaced from the stop member 32 by a distance greater than .030 inch and the displacement core 30 may be again advanced by a distance of .030 inch without the probe 35 encountering the stop member 32.

It is apparent that the creep measurement of a specimen may be carried out entirely by the transducer system or entirely by the probe 35 in cooperation with the stop member 32. Thus either of the two facilities for creep measurement may be used independently of the other so that one may be used to check the other and one may be relied upon entirely in the event that the other fails.

Preferably the design of the transducer system is such that a zero shift compensation can be introduced if needed. The zero shift compensation adds a calibrated amount of inductance to one leg of the transducer bridge to shift zero when the capsule is put in the reactor and subjected to heat.

In the event that the temperature of the capsule drops unduly, for example, when the reactor is turned off, a heating element surrounding the specimen inside the capsule is energized and, on the other hand, in the event the temperature of the capsule tends to climb higher than desired for the test, a cooling coil surrounding the specimen is placed in operation. Both the heating element and the cooling coil are automatically controlled in response to temperature changes at the specimen.

After a test is completed, the capsule and at least a portion of the conduits 12–15 are contaminated and must be discarded in some appropriate manner. All of the structure shown in FIG. 1 that is outside the capsule, however, is available for reuse with a new capsule for a subsequent creep test.

Structural details of the capsule

Figure 2:
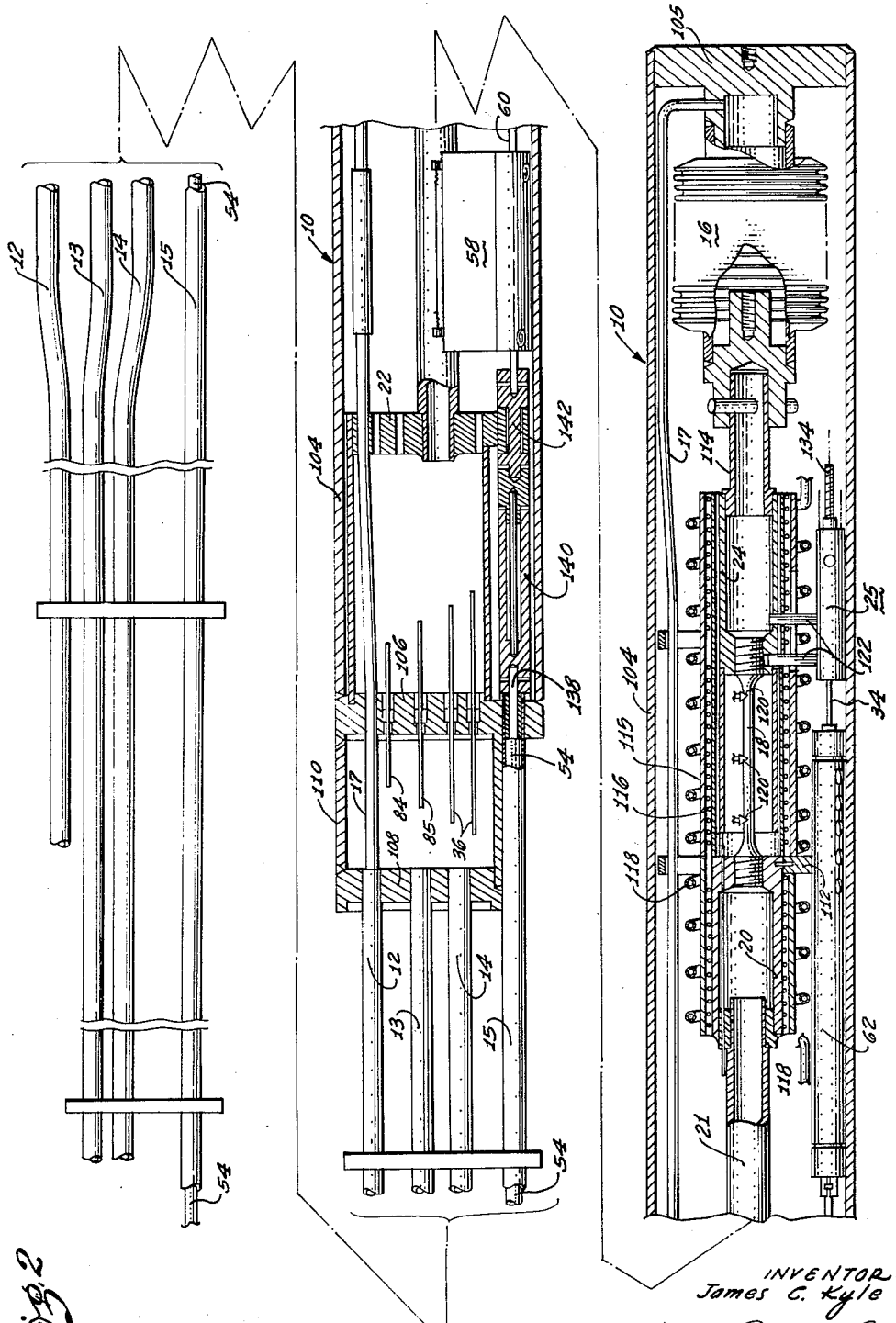

As shown in FIG. 2, the capsule 10 has a cylindrical wall 104 and is closed in a fluid-tight manner by a forward end wall 105 and a rearward end wall 106. Various wires including the previously mentioned wires 36, 84 and 85 extend through the rear end wall 106 in a sealed manner. In addition the previously mentioned vent tube 17 and other tubes (not shown) for circulation of refrigerant also extend through the rear end wall 106 in a sealed manner.

The previously mentioned conduit 15 that supplies the pressurized gaseous fluid to the capsule and that also encloses the previously mentioned shaft 54 terminates in the rear end wall 106 in a sealed manner but the remaining conduits including the previously mentioned conduits 12, 13 and 14 terminate in the end wall 108 of a vestibule that is formed on the rear end of the capsule by a cylindrical wall 110.

The previously mentioned members 20, 21 and 22 that connect one end of the specimen 18 with the structure of the capsule comprise respectively a cylindrical member, a tube and a bulkhead. The forward end of the cylindrical member 20 is mounted on a second bulkhead 112. The rear end of the specimen 18 threads into the cylindrical member 20 and the forward end threads into the previously mentioned fitting 24 which is a cylindrical member similar to the cylindrical member 20. The forward end of the second cylindrical member 24 is connected by a tube 114 to the rear end of the bellows, the forward end of the bellows being connected to the forward end wall 105 of the capsule. The previously mentioned vent tube 17 communicates with the forward end of the bellows as indicated in FIG. 2.

The specimen 18 and the two cylindrical members 20 and 24 at the opposite ends of the specimen are surrounded by a cylindrical shell 115 which incorporates a heating element 116 for use whenever necessary to maintain the temperature of the specimen. The heating element 116 is energized from a remote source by suitable wires which extend through one of the conduits of the previously mentioned passage means. The cylindrical shell 115 is surrounded by a cooling coil 118 which is supplied with refrigerant from a remote source by means of tubes which extend through the previously mentioned passage means. Both of the two sources are thermostatically controlled by suitable circuitry which includes three thermocouples 120 that are suitably clipped to the surface of the specimen 18.

The previously mentioned carriage 25 for the coil component 26 and the stop member 32 is in the form of a cylinder which is connected to the cylindrical fitting 24 by two spaced radial support members 122. The internal structure of the carriage 25 is shown in FIG. 3.

As shown in FIG. 3, an axial tube 124 is mounted in the cylindrical carriage 25, the tube being supported and centralized by a plurality of radial flanges 125. As indicated in FIG. 4, the radial flanges 125 are secured to the surrounding cylindrical wall of the carriage by welding 126 and are provided with radial slots 128. The forward end of the axial tube 124 is supported by a surrounding ring 130 of insulating material which closes the forward end of the carriage. Mounted between radial flanges 125 of the axial tube 124 are the two coils 26a and 26b of the previously mentioned coil component 26 of the displacement transducer 28. The previously mentioned wires 36 which are connected to the two coils 26a and 26b extend through the insulating ring 130 as shown. The previously mentioned sensing rod 34 which is made of nonmagnetic metal extends through the axial tube 124 and normally positions the core component 30 of the displacement transducer 28 in the longitudinal region of the two coils 26a and 26b.

FIG. 3 shows how the previously mentioned stop member 32 is mounted on the previously mentioned wire 84 with the wire extending through a core 132 of insulating material. The core 132 is mounted in an adjustment tube 134 that is formed with an external screw thread 135 in engagement with a complementary internal screw thread 136 of the axial tube 124. By virtue of this construction the adjustment tube 134 may be shifted longitudinally as required for calibration.

As shown in the central section of FIG. 2 the previously mentioned shaft 54 is formed with a reduced end 138 which is connected to the reduction gearing in the gear box 58 by an elongated shaft coupling 140 and a shorter shaft coupling 142. As previously stated the output shaft 60 of the gear box 58 is connected to the screw mechanism 62.

As shown in FIGS. 5, 6 and 7 the screw mechanism 62 has a cylindrical housing 144 which is provided with suitable vent holes 145. The cylindrical housing 144 is suitably anchored in a fixed manner and for this purpose may be firmly attached to the bulkhead 112 (FIG. 2).

The input shaft 146 of the screw mechanism 62 is fixedly connected to a screw member 148 and for this purpose is both threaded into the screw member and anchored to the screw member by a cross pin 150. The screw member 148 has a fine low pitch external screw thread 152 which engages a corresponding internal screw thread of a sleeve 154 that is slidingly mounted inside the cylindrical housing 144. The slidable sleeve 154 which is made in two fixedly interconnected parts is held against rotation by a cross pin 155 which is secured in position by welding 156. The cross pin 155 extends in a sliding manner into a longitudinal slot 158 in the cylindrical housing 144. The slidable sleeve 154 is connected to the previously mentioned sensing rod 34 by an axial rod 160.

The screw mechanism 62 incorporates two springs to take up backlash. As shown in FIG. 5 one spring 162 is a coil spring acting in compression against the leading end of the slidable sleeve 154, the forward end of the spring seating against a washer 164. As best shown in FIG. 7 the second spring 165 is a torque spring one end of which slidingly engages the longitudinal slot 158, the other end being anchored in a radial bore 166 in the slidable sleeve 154.

*Wiring diagram FIG. 8*

The motor 52 and the D.C. power supply 17 are energized by a pair of leads 168 and 170 from a suitable A.C. source under control of a master switch 172 and a suitable indicator lamp 174 is energized whenever the master switch is closed. The D.C. power supply 17 which includes a rectifier tube 175 is of conventional construction. The negative side of the D.C. power supply is grounded and is connected through a resistor 176 to the two cathodes 92 and 95 of the dual amplifier 76. The positive side of the D.C. power supply 17 is connected to an ammeter 178 and a shunt resistor 180 which, in turn, are connected to the anode 90 through a resistor 182 and to the anode 94 through a resistor 184. The two anodes 90 and 94 are interconnnected by an ammeter 185 in series with the coil 186 of the previously mentioned sensitive relay 75.

One side of the sensitive relay 75 is connected to the lead 170 by a wire 188 and the other side is connected to the lead 168 through the two coils 190 and 192 of a heavy duty relay that functions as the working part of the previously mentioned intermittent reversing switch 70. The coil 190 controls a pair of relay contactors 194 and 195 and the second coil 192 controls a pair of relay contactors 196 and 198.

The contactor 194 is connected by a wire 200 to the previously mentioned timer 96 to start the operating cycle of the timer whenever the intermittent reversing switch 70 initiates the advancing movement of the probe 35. The timer 96 incorporates a switch 202 which is in the motor circuit and which is opened by the timer at the end of the timing cycle. The previously mentioned manual reversing switch 68 has a pair of switch arms 204 for directional control of the motor 52 independently of the intermittent reversing switch 70.

FIG. 9 shows how the described embodiment of the invention may be modified by omitting the cooling coil 118 and by substituting a coiled tubular heating element 205 for the heating element 116. When heating is required, the tubular heating element 205 is energized in the usual manner. On the other hand when cooling is required, cooling fluid is circulated through the tubular heating element 205, with the heating element de-energized.

FIG. 10 shows the construction of the measuring mechanism of an exploration unit in the form of an extensile tubular arm generally designated 210, the tubular arm having a main or base section 212 and a movably telescoped outer end section 214. The outer end section 214 carries a transducer, generally designated 215, having a coil component 216 and a movable core component 218. Since the outer end section 214 of the tubular arm is normally fixed relative to the base section 212, the coil component 216 of the transducer is normally fixed relative to the base section, but extension or contraction of the outer end section of the arm will shift the position of the coil component 216 relative to the base section or any selected point on the base section of the arm. A selected reference point, for example, may be the end rim 220 of the base section 212 of the arm.

The transducer core 218 is fixedly connected in a suitable manner to a suitable follower 222 which may be a polished sapphire body, the follower being shown in contact with the surface 224 of a plate or wall member 225. In the construction shown, the follower 222 is carried by a floating plunger 226 that is slidingly mounted in an axial bore 228 on the leading end of the outer end section 214 of the arm. In this embodiment of the invention, a gaseous fluid bearing is provided for the plunger 226 and for this purpose the bore 228 is formed with an inner circumferential groove 230 which is in communication with a flexible hose 232 that provides a continuous supply of a suitable gaseous fluid at a suitable pressure. For example, the gaseous fluid may be dry nitrogen at 30 p.s.i. A bleeder port 234 is provided for the gaseous fluid and the floating plunger 226 is formed with a circumferential groove 235 in the region of the bleeder port.

The core component 218 of the transducer 215 moves in unison with the floating plunger 226 and for that purpose is fixedly connected to the floating plunger by an axial rod 236. The axial rod 236 slidingly extends through a transverse wall 238, so that the core component 218 cooperating with the transverse wall 238 may serve as a stop means to limit the outward extension of the floating plunger.

Any suitable means may be provided to yieldingly urge the floating plunger 226 outward to cause the follower 222 to follow the wall surface 224. Preferably, what may be termed an air spring is employed for this purpose. In the construction shown, the inner end of the floating plunger 226 serves as a piston and extends into a pressure chamber 240 that is supplied with a suitable gaseous fluid under a suitable pressure by a flexible hose 242. Dry nitrogen may be employed for this purpose under a pressure of .08–1.2 p.s.i. to exert a pressure on the follower 222 of .1–1.5 ounce.

Three wires 244 (one not shown) extend from the coil component 216 of the transducer 215 through a flexible tube 245 to a suitable remote indicating or recording device. For example, the three wires may be connected to a remote graph pen.

Advance or retraction of the outer end section 214 of the tubular arm 210 may be controlled by an axial lead screw 246 which engages the thread of a nut 248 that is fixedly carried by the outer end section. To keep the outer end section 214 from rotating in response to rotation of the lead screw 246, the outer end section may be provided with a headed radial pin 250 that slidingly engages a longitudinal slot 252 in the base section 212 of the arm. Preferably, backlash is prevented by a previously described torque spring 165 which engages the longitudinal slot 252.

The lead screw 246, which has a fine pitch, may be connected by a suitable yielding coupling to reduction gearing in a gear box 254, the coupling being axially yieldable to avoid damage in the event that the outer end section 214 of the arm is subjected to an excessive axial force. In the construction shown, a tubular end portion 255 of the lead screw telescopes over a short output shaft 256 of the reduction gearing with the tubular end portion longitudinally slotted to engage a cross pin 258 on the output shaft. The lead screw 246 is provided with a radial radial flange 260 and both the tubular end portion 255 and the flange are confined in a cylindrical chamber 262 with the flange normally in abutment against an end wall 264 of the chamber. A heavy coil spring 265 in the cylindrical chamber 262 pressing against a washer 266 maintains the flange 260 in its normal position. In the event an excessive axial force is applied to the outer end of the end section 214 of the arm, the spring 265 yields to permit retraction of the outer end section.

The reduction gearing in the gear case 254 is operatively connected to a remotely controlled reversible motor 268 by means of a suitable coupling. In the construction shown, a flanged collar 270 on the input shaft 272 of the reduction gearing is connected by pins 274 to a second flanged collar 275 on the drive shaft 286.

Any suitable means may be provided to measure the shift of the outer end section 214 of the arm and the transducer coil component 216 caried thereby that results from energization of the motor 268. For this purpose a suitable pulse generator may be associated with the motor. In the construction shown, a permanent magnet 278 is mounted on the flanged collar 275 to rotate in an orbit past a sensing element 280. Each revolution of the permanent magnet 278 by the motor 268 sends a pulse of current through a pair of wires 282 in a flexible tube 284 to a suitable remote indicating or recording device such as a print head.

It is readily apparent how the exploration unit shown in FIG. 10 serves its purpose. With the exploration arm 210 and the wall member 225 both stationary, the exploration arm is mounted at a fixed distance from the surface 224 of the wall, the fixed distance being selected to place the follower 222 in contact with the wall surface 224 with the core component 218 of the transducer 215 within the sensing range of the coil component 216. If the core component 218 is not within the sensing range of the coil component 216, the motor 268 may be energized to advance the outer end section 214 of the exploration arm. Preferably the outer end section 214 of the arm is initially adjusted by means of the motor 268 to place the coil component 216 at its null position relative to the core component 218 in preparation for an exploration cycle.

With the bearing gas supplied through the flexible tube 232 to float the plunger 226 and with additional gas delivered through the tube 242 to urge the follower 222 against the wall surface 224, relative movement is created in some suitable manner between the exploration unit and the wall member 225 longitudinally of the wall member. If the wall member 225 is circular in cross section, the exploration arm 210 may be swung about the center or axis of curvature of the wall member for the purpose of creating the desired relative movement. The precise distance from the axis of rotation of the exploration arm to the wall surface 224 throughout the cycle of rotation of the exploration arm may be found by adding the distance indicated by the printing head controlled by the pulse-generating sensing element 280 and the distance indicated by the printing head that is controlled by the transducer 215.

If the exploration arm 210 is swung about a horizontal axis, gravity imposes a varying torque load on the arm which causes the arm to flex alternately in the direction of rotation and in the opposite direction. For this reason it is desirable to associate a torque meter with the arm to indicate the changes in the torque load so that correction may be made for the fact that the follower 222 alternately advances and lags relative to the rotation of the base portion of the arm at the axis of rotation. FIGS. 11 and 12 show how the exploration arm may be provided with a torque meter for this purpose.

FIG. 11 shows how the base portion 210a of an exploration arm may be of arcuate configuration and may be integral with a tubular hub 285 that is mounted in a pair of ball bearings 286. The base end of the tubular hub 285 is in the form of a gear 288 that is in mesh with a drive pinion 290 on the drive shaft 292 off a drive motor 294. A second pinion 295 on the drive shaft 292 is in mesh with a gear 296 to drive a counter 298, which counter may operate a print head 300.

Inside the tubular hub 285 an axial rod 302 fixedly extends rom the base portion 210a of the arm into a coil housing 304 that is fixedly mounted on the tubular hub. The coil housing has four equally spaced poles carrying four corresponding coils 305 and the free end of the axial rod 302 carries an armature 306 in the same plane as the four poles. The four coils 305 and the armature 306 constitute a rotary transducer which is connected by four wires 308 to a remote transducer 310. The remote transducer 310 controls a print head 312 which records the changes in the torque load on the exploration arm. The data supplied by the print head 312 is combined with the data obtained by the pulse code generator associated with the motor 268 and the data derived from the transducer 215.

FIG. 13 shows how two exploration arms designated A and B, may be employed to ascertain the configuration of a curved wall 314 which wall may be a section of a cylinder or may be the section of a dome. The required relative movement between the curved wall 314 and the two exploration arms may be achieved by rotating the exploration arm A about the center or axis of curvature of the wall and by synchronously moving the exploration arm B around a circular track having the same center or axis of curvature. A simpler procedure, however, is to hold the two exploration arms A and B stationary and to rotate the curved wall 314 about its point or axis of curvature.

Each of the two exploration arms A and B is of the same construction as the previously described exploration arm 210 in FIG. 10, each exploration arm having the usual telescoped outer end section 214 carrying the usual movable sapphire follower 222. The previously mentioned wires 282 from the pulse code generator of the exploration arm A are connected to a counter 315 which controls a print head 316 and, in like manner, the pulse code generator of the exploration arm B is connected to a counter 318 that operates a print head 320.

The previously mentioned three wires 244 from the measuring transducer of the exploration arm A are connected to the coil component 320 of a third transducer 322 which is a balancing transducer having a balancing core component 324. The three wires also control a demodulator and amplifier 325 which controls a two-phase reversible servo motor 326. In the previously described manner, the motor 326 controls the position of the balancing core 324 and operates an inside measurement counter 328 and an associated print head 330.

In like manner the wires 244 from the measuring transducer of the exploratory arm B are connected to a coil component 332 of a fourth transducer 334 which is a balancing transducer with a balancing core component 335. A demodulator and amplifier 336 controls the two-phase reversible motor 338 that controls the core component 335 as well as an outside measurement counter 340 and an associated print head 342.

A fifth transducer, generally designated 344, derives the thickness of the curved wall 314 and for this purpose has a coil component 345 mechanically actuated by the balancing core component 324 of the transducer 322 and has a core component 346 which is directly mechanically connected to and controlled by the balancing core component 335 of the transducer 334. Three wires 348 from the coil component 345 are connected to the coil component 350 of a sixth transducer 352 which is a balancing transducer with a balancing core component 354. The wires 348 are also connected to a demodulator and amplifier 355 which controls a two-phase reversible motor 356 which controls the core component 354 as well as a thickness measurement counter 358 and an associated print head 360.

It is apparent that any two of the three transducers 322, 334 and 344 will provide adequate data regarding variations in configuration and thickness of the curved wall 314. Thus data from the inside measurement counter 328 and data from the outside measurement counter 340 will give variations in the configurations of the inner and outer surfaces of the curved wall 314 and variations in the thickness of the curved wall member may be derived from these data. Data from the inside measurement counter 328 and from the thickness measurement counter 358 will give the changing configuration of the inner circumferential surface of the curved wall 314 and the varying thickness of the curved wall, from which data the configuration of the outer circumferential surface of the wall may be derived. In like manner, data from the outside measurement counter 340 may be combined with data from the thickness measurement counter 358.

My description in specific detail of the selected practices of the invention will suggest various changes, substitutions and other departures from my disclosure within the spirit and scope of the appended claims.

I claim:

1. In an extensometer for measuring dimensional changes of a specimen in a particular environment, the combination of:

a chamber for positioning in the particular environment;

an expansible structure inside said chamber dividing the interior of the chamber into two compartments, one of said compartments being under relatively high gaseous pressure and the other of said compartments being under a relatively low gaseous pressure thereby creating a force to change the dimension of the expansible structure in accordance with the difference in gaseous pressures;

means to connect said specimen to said expansible structure and to the structure of said chamber to resist said force whereby the specimen is placed under stress by the force;

first means connected to said specimen for movement with said specimen in accordance with the dimensional changes in said specimen;

second means associated with said first means for reciprocating movement between a first position contiguous to said first means and a second position disposed by a particular distance from said first means; and means operatively coupled to said second means for detecting the displacements of said second means in accordance with the movements of said first means of the dimensional changes of the specimen.

2. A combination as set forth in claim 1 in which one of said compartments is vented to the atmosphere; and in which means in communication with the pressurized compartment maintains the compartment pressurized.

3. In an extensometer for measuring dimensional changes of a specimen in a particular environment, the combination of:

a chamber for positioning in the particular environment;

an expansible structure inside said chamber dividing the interior of the chamber into two compartments, one of said compartments being under relatively high gaseous pressure and the other of said compartments being under a relatively low gaseous pressure thereby creating a force to change the dimension of the expansible structure in accordance with the differences between the gaseous pressures;

fluid passage means extending to the pressurized compartment from a position external to the pressurized compartment to maintain the pressure in the compartment substantially constant with changes in temperature of the particular environment;

means to anchor one end of the specimen to said chamber inside the chamber and to anchor the other end of the specimen to said expansible structure to place the specimen under stress by said force and to obtain a displacement of said other end of the specimen in accordance with said stress;

first means including mechanical means in said chamber operatively coupled to said other end of said specimen for movement in accordance with the displacement of the other end of the specimen;

second means operatively coupled to the first means for reciprocal movement and for following the first means in such reciprocal movement; and third means operatively coupled to the second means for indicating the movement of the second means in following the displacement of the first means.

4. In an extensometer for measuring changes in dimension of a specimen, the combination of:

means to place the specimen under stress;

a first transducer having two components, one of said components being normally stationary and the other of said components being connected with the specimen to move with changes in dimension of the specimen;

a second transducer at a remote station having two components;

means connected to said first transducer to detect the relative positions of the two components thereof;

means responsive to said detecting means to maintain the two components of the second transducer at the same relative positions;

a first measuring means responsive to said responsive means;

a stop member connected with the specimen to move with changes in dimension of the specimen;

means operable from a remote station to shift intermittently said one normally stationary component a given distance in the direction of movement of the associated component that is connected to the specimen;

a probe connected with said normally stationary component to shift therewith in the direction of said stop member, said distance being less than required for said probe to reach the stop member, said means operable from a remote station being operable to shift said normally stationary component greater than said distance until the probe at least nearly contacts the stop member; and a second measuring means responsive to movements of said probe.

5. A combination as set forth in claim 4 which includes:

means to sense close proximity of said probe to said stop member; and a control for said means that is operable from a remote station, said control being responsive to said proximity-sensing means to reverse the movement of the probe when the probe contacts the stop member.

6. In an extensometer for measuring changes in dimension of a specimen, the combination of:

means to anchor one end of the specimen;

means to apply force to the other end of the specimen to stress the specimen for a displacement of the other end of the specimen in accordance with such stress;

a stop member connected with said other end of the specimen to move therewith;

a probe movable relative to said stop means;

means operatively coupled to said probe for obtaining a displacement of said probe in accordance with a displacement of the stop member; and means operatively coupled to said probe for providing an indication when said probe becomes displaced from said stop member by less than a particular distance.

7. In the extensometer set forth in claim 6, means operatively coupled to said probe for inhibiting further displacement of said probe upon an indication by said last mentioned means; and means operatively coupled to said probe for providing an indication as to the displacements of said probe.

8. In an extensometer for measuring changes in dimension of a specimen, the combination of:

means to anchor one end of the specimen;

means to apply force to the other end of the specimen to stress the specimen;

a stop member for connection with said other end of the specimen to move therewith;

a probe for cooperation with said stop means;

actuating means to move said probe into close proximity to the stop means;

meausring means to measure the movements of said probe thereby to measure the changes of position of said stop member; and means to reverse said actuating means for retraction of the probe in response to approach of the probe to close proximity to the stop member.

9. The combination as set forth in claim 8 which includes:

means operable after a time period of probe retraction to reverse said actuating means to advance the probe again towards the stop member whereby the probe automatically continually reciprocates relative to the stop member.

10. In an extensometer for measuring changes in dimension of a specimen, the combination of:

means to anchor one end of the specimen;

means to apply force to the other end of the specimen to stress the specimen;

a stop member for connection with said other end of the specimen to move therewith;

a probe for cooperation with said stop member;

actuating means to move said probe relative to the stop member;

measuring means to measure the movements of said probe thereby to measure the changes of position of said stop member;

a first means to reverse said actuating means for retraction of the probe in response to approach of the probe to close proximity to the stop member;

second means operable after a time period of probe retraction to reverse said actuating means to advance the probe again towards the stop member whereby the probe continually reciprocates automatically relative to the stop member; and timer means responsive to said second means to terminate the advance of the probe after a predetermined period of time in the event that the first means fails to retract the probe when the probe contacts the stop member.

11. A combination as set forth in claim 10 which includes signal means to indicate when said timer means operates to terminate the advance of the probe.

12. A combination as set forth in claim 10 in which said probe is of resilient construction for elastic deformation when urged against the stop member.

13. In an extensometer for measuring changes in dimension of a specimen, the combination of:

means to anchor one end of the specimen;

means to apply force to the other end of the specimen to stress the specimen;

a stop member for connection with said other end of the specimen to move therewith;

a probe for cooperation with said stop member;

actuating means to move said probe against the stop member;

a circuit including said probe and said stop member to close when the probe approaches close proximity to said stop member;

means to reverse said actuating means for retraction of the probe in response to closing of said circuit; and measuring means to measure the movements of said probe thereby to measure the changes in position of said stop member.

14. In an extensometer for measuring changes in dimension of a specimen, the combination of:
means to anchor one end of the specimen;
means to apply force to the other end of the specimen to stress the specimen;
a stop member for connection with said other end of the specimen to move therewith;
a probe for cooperation with said stop member;
actuating means to move said probe relative to the stop member;
a circuit including said probe and said stop member to close when said probe approaches close proximity to the stop member;
means to reverse said actuating means for retraction of the probe in response to closing of said circuit; and after a time delay to again reverse the actuating means in response to opening of the circuit thereby to advance the probe; and
means to measure the movements of said probe thereby to measure the changes in position of said stop member.

15. In an extensometer for measuring dimensional changes of a specimen in a sealed environment, the combination of:
a sealed capsule to contain the specimen in the environment;
an expansible structure inside said capsule dividing the interior of the capsule into two compartments;
passage means comprising at least one passage extending to the capsule from a remote station,
said passage means including a passage to a first one of said two compartments from a high pressure fluid source to maintain the compartment under pressure, the second compartment being under low fluid pressure thereby to create a differential force to change the dimension of the bellows structure;
means connecting said specimen to said expansible structure and to the structure of said capsule to resist said differential force whereby the specimen is placed under stress by the force and its dimensions are changed in accordance with said force;
a first member in the capsule and connected with the specimen to move in response to changes in dimension of the specimen;
a second member operatively coupled to the first member and physically separated from the first member for incremental movement in accordance with the movements of the first member;
means operatively coupled to the second member for obtaining the incremental movements of the second member to follow the movements of the first member, and
means operatively coupled to the first member for providing an indication as to the incremental movements of the second member.

16. In an extensometer for measuring changes in dimension of a specimen over a given test period, the combination of:
a structure to support the specimen;
means on said structure to stress the specimen for obtaining changes in the dimensions of such specimen in accordance with such stress;
first means operatively coupled to the specimen for movement in accordance with changes in the dimension of the specimen;
second means physically separated from the first means for movement with the first means;
third means operatively coupled to the second means for obtaining movements of the second means in accordance with the movements of the first means; and
fourth means operatively coupled to the second means for measuring the movements of the second means.

17. A combination as set forth in claim 16 which includes means on said structure to heat the specimen, means to sense the temperature of the specimen; and
means responsive to said temperature sensing means to control said heating means.

18. A combination as set forth in claim 16 which includes means to circulate cooling fluid through said support structure from a remote source in the event the temperature of the environment rises excessively.

19. The combination set forth in claim 16, wherein the third means are constructed to provide incremental movements of the second means and wherein the fourth means are constructed to measure the incremental increments of the second means.

20. The combination set forth in claim 19, including,
fifth means operatively coupled to the second means for providing the incremental movements of the second means on a reciprocal basis toward and away from the first means; and
sixth means operatively coupled to the second and fourth means for limiting the incremental movements of the second means toward the first means to a particular distance displaced from the first means.

21. In an extensometer for measuring dimensional changes in a specimen in a high temperature environment, the combination of:
a chamber;
passage means connected to said chamber to serve as handle means for maneuvering the chamber into position in the high temperature environment;
said passage means providing a plurality of passages;
fluid-pressure-responsive means in said chamber and connected to at least one of said passages to receive fluid pressure for placing the specimen under stress and for producing dimensional changes in said specimen in accordance with such stress;
means in said chamber and physically disconnected from said specimen but operatively coupled to said specimen to sense changes in dimension of the specimen and provide signals having characteristics representing the sensing by the sensing means; and
remote indicating means connected with said sensing means through one of said passages for providing an indication of the sensing by said sensing means.

22. In an extensometer for measuring dimensional changes in a specimen in a high temperature environment, the combination of:
a chamber;
passage means connected to said chamber to serve as handle means for maneuvering the chamber into position in the high temperature environment; said passage means providing a plurality of passages;
fluid-pressure-responsive means in said chamber to place the specimen under stress, said responsive means being connected to one of said passages to receive fluid pressure from a remote source;
a transducer having two components, one of said components being normally stationary in said chamber, the other component being adapted for connection with the specimen in the chamber to move with changes in dimension of the specimen;
remote indicating means responsive to said transducer and connected therewith through one of said passages; and
remote actuating means connected to said normally stationary component through one of said passages to shift the position of the normally stationary component.

23. In an extensometer for measuring dimensional changes in a specimen in a high temperature environment, the combination of:

a chamber;

passage means connected to said chamber and providing a plurality of passages;

fluid-pressure-responsive means in said chamber to place the specimen under stress, said responsive means being connected to one of said passages to receive fluid pressure from a remote source;

a transducer having two components, one of said components being normally stationary in said chamber, the other component being adapted for connection with the specimen in the chamber to move with changes in dimension of the specimen;

remote indicating means responsive to said transducer and connected therewith through one of said passages;

remote actuating means;

a shaft operated by said actuating means and extending through one of said passages;

screw means in said chamber operated by said shaft and operatively connected with said normally stationary component to change the position of the component; and remote measuring means operatively connected to said shaft.

24. In an extensometer for measuring dimensional changes in a specimen in a high temperature environment, the combination of:

a chamber;

passage means connected to said chamber to serve as handle means for maneuvering the chamber into position in the high temperature environment;

said passage means providing a plurality of passages;

fluid-pressure-responsive means in said chamber to place the specimen under stress, said responsive means being connected to one of said passages to receive fluid pressure from a remote source;

a stop member in said chamber adapted for connection with the specimen to move in response to changes in dimension of the specimen;

remote actuating means;

a probe in said chamber;

operating means extending through one of said passages and operatively connecting said probe to said actuating means for movement of the probe relative to said stop member;

means to control said actuating means automatically for reciprocation of said probe repeatedly into and out of close proximity to said stop member; and remote means to measure the movements of said operating member.

25. In an extensometer for measuring changes in dimension of a specimen under particular temperature over a given test period, the combination of:

a structure to support the specimen in a high temperature environment;

means on said structure to stress the specimen to provide changes in the dimension of the specimen in accordance with such stress;

means physically separated from said structure but operatively coupled to said structure to sense changes in dimension of the specimen;

remote measuring means responsive to said sensing means to provide an indication of the changes sensed by the sensing means;

a hollow heating element on said structure means to increase the temperature of the specimen to the particular temperature; and means to circulate cooling fluid through the heating element to reduce the temperature of the environment to the particular temperature.

References Cited by the Examiner

UNITED STATES PATENTS

| | | | |
|---|---|---|---|
| 1,332,491 | 3/20 | Figari | 73—95 |
| 2,375,034 | 5/45 | Semchyshen | 73—15 |
| 2,520,786 | 8/50 | Scott | 73—95 |
| 2,685,195 | 8/54 | Streblow | 73—15 |
| 2,699,060 | 1/55 | Safford | 73—94 |
| 2,814,883 | 12/57 | Strimel | 33—147 |
| 2,827,705 | 3/58 | Elliott et al. | 33—147 |
| 2,848,815 | 8/58 | Scheu | 33—143 |
| 3,010,307 | 11/61 | Schwegler | 73—15 |
| 3,100,253 | 8/63 | O'Conner | 73—15 |

OTHER REFERENCES

Bohn and Murphy: Ames Laboratory Research and Development Report, IS–167, A High-Temperature Vacuum Extensometer.

DiLiberti et al.: "An Improved Method for Determining Heat Distortion Temperature," Plastics, February 1945.

Hammel and Uhrig: Ames Laboratory Research and Development Report, IS–66, An Autographic Elevated Temperature Creep Testing Facility.

RICHARD C. QUEISSER, *Primary Examiner.*

ROBERT EVANS, *Examiner.*

Dedication 3,212,321.—*James C. Kyle*, Glendora, Calif. ENCAPSULATED EXTENSOMETER. Patent dated Oct. 19, 1966. Dedication filed June 3, 1970, by the assignee, *Physical Sciences Corporation*.
  Hereby dedicates the entire term of said patent to the Public.
  [*Official Gazette November 10, 1970.*]